United States Patent
O

(10) Patent No.: US 10,775,013 B2
(45) Date of Patent: Sep. 15, 2020

(54) VEHICULAR LIGHT

(71) Applicant: Stanley Electric Co., Ltd., Tokyo (JP)

(72) Inventor: Han O, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/281,126

(22) Filed: Feb. 21, 2019

(65) Prior Publication Data
US 2019/0257491 A1 Aug. 22, 2019

(30) Foreign Application Priority Data
Feb. 21, 2018 (JP) .................. 2018-029129

(51) Int. Cl.
F21S 41/24 (2018.01)
F21S 41/32 (2018.01)
(Continued)

(52) U.S. Cl.
CPC ............ *F21S 41/24* (2018.01); *B60Q 1/0011* (2013.01); *F21S 41/143* (2018.01); *F21S 41/322* (2018.01);
(Continued)

(58) Field of Classification Search
CPC ........ F21S 41/24; F21S 43/239; F21S 43/249; F21S 43/243; F21S 43/14; F21S 43/245; F21S 43/237; F21S 41/143; F21S 41/322; F21S 43/235; G02B 6/0045; G02B 6/0083; G02B 6/0038; B60Q 1/0011;
(Continued)

(56) References Cited

U.S. PATENT DOCUMENTS 7,438,444 B2 * 10/2008 Pao ..................... G02B 19/0071
362/327
10,100,995 B2 * 10/2018 Hirata ..................... F21S 41/00
(Continued)

FOREIGN PATENT DOCUMENTS

JP 2017-183287 A 10/2017
JP 2017-228450 A 12/2017
WO 2017/098107 A1 6/2017

OTHER PUBLICATIONS

Machine English Translation of JP2017183287A; Nakaarai et al. (Year: 2017).*
(Continued)

Primary Examiner — Isiaka O Akanbi
Assistant Examiner — Glenn D Zimmerman
(74) Attorney, Agent, or Firm — Xsensus LLP

(57) ABSTRACT

A vehicular light is provided which is capable of forming an emission pattern with a good appearance at the time of lighting. The vehicular light has a light guide body having a light guide portion and a slit that penetrates the light guide portion in its thickness direction and linearly extend along a light guide path of light rays emitted from a plurality of LED light sources and guided within the light guide portion. The slit is composed of three regions including a constant width region formed in a predetermined length range toward the distal end, a tapered width region gradually narrowing toward the distal end, and a distal end region having a distal end of a curved surface shape formed in the distal end portion of the tapered width region.

14 Claims, 17 Drawing Sheets

(51) Int. Cl.
*F21S 41/143* (2018.01)
*B60Q 1/00* (2006.01)
*F21V 8/00* (2006.01)
*F21S 43/243* (2018.01)
*F21S 43/249* (2018.01)
*F21S 43/239* (2018.01)
*F21Y 115/10* (2016.01)

(52) U.S. Cl.
CPC ........... *F21S 43/239* (2018.01); *F21S 43/243* (2018.01); *F21S 43/249* (2018.01); *G02B 6/0045* (2013.01); *G02B 6/0083* (2013.01); *F21V 2200/20* (2015.01); *F21Y 2115/10* (2016.08); *G02B 6/0038* (2013.01)

(58) Field of Classification Search
CPC ............. F21Y 2115/10; F21V 2200/20; F21W 2107/10; F21W 2103/60
See application file for complete search history.

(56) References Cited

U.S. PATENT DOCUMENTS

2001/0019479 A1* 9/2001 Nakabayashi ....... G02B 6/0028
362/615
2009/0108188 A1* 4/2009 Urabe ................ G01D 5/34776
250/231.1
2014/0063847 A1 3/2014 Sakamoto et al.

OTHER PUBLICATIONS

Extended European Search Report dated Jun. 24, 2019 in European Application No. 19158456.4.

* cited by examiner

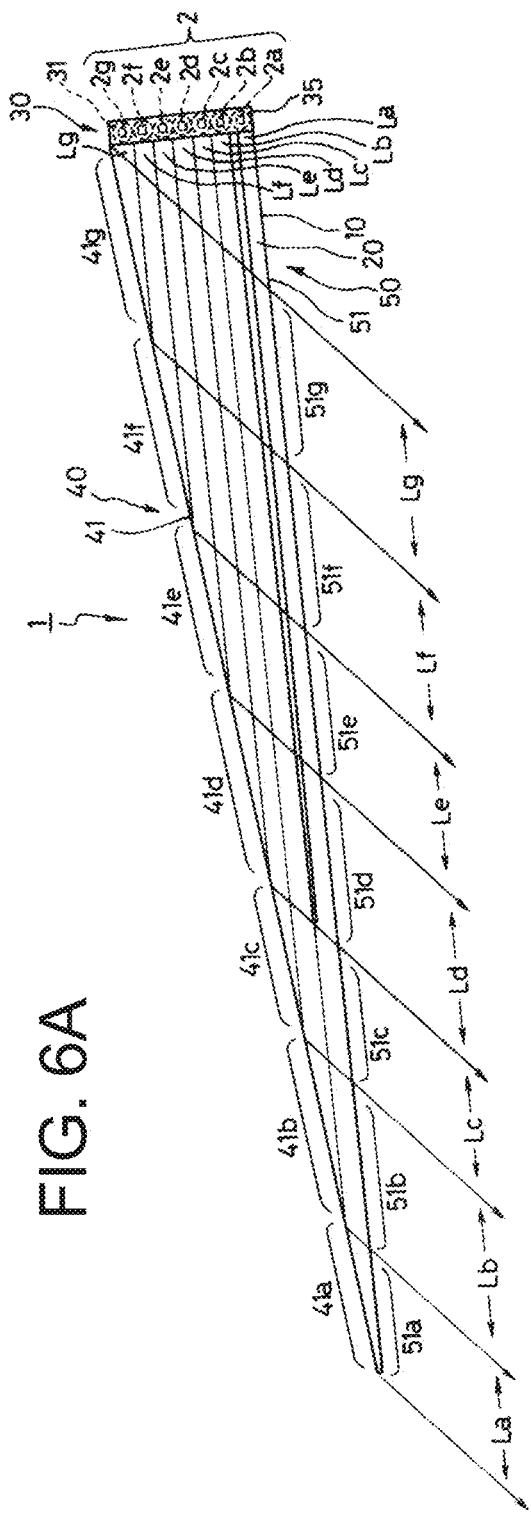

VEHICULAR LIGHT

This application claims the priority benefit under 35 U.S.C. § 119 of Japanese Patent Application No. 2018-029129 filed on Feb. 21, 2018, which is hereby incorporated in its entirety by reference.

TECHNICAL FIELD

The presently disclosed subject matter elates to a vehicular light, and more particularly, to a vehicular light provided with a light guide body configured to receive and take in light from an LED light source and to form a desired emission pattern (display pattern) by light guide control.

BACKGROUND ART

Conventionally, this type of vehicular light has been disclosed under the name "vehicular light" in Japanese Patent Application Laid-Open No. 2017-183287.

FIG. 1 shows a conventional vehicular light disclosed in the aforementioned laid-open publication. The vehicular light has a flat plate-shaped light guide body 80 having a substantially triangular shape. The light guide body 80 includes end surfaces corresponding to respective sides of the triangle and serving as optical functional surfaces as a light incident portion 81, a light reflection portion 82, and a light exit surface 83.

A plurality of LED light sources 84 are arranged at predetermined intervals in the vicinity of the light incident portion 81. In the light incident portion 81, lens cut portions 85 are formed at corresponding positions on the respective optical axes of the LED light sources 84. The lens cut portion 85 is configured to receive the light emitted from each LED light source 84 while refracting the received light to take it into the light guide body as parallel light.

The light guide body 80 is provided with a plurality of through slits 86 each extending along the parallel light introduced into the light guide body 80 from the LED light source 84 side toward the distal end side at a corresponding intermediate position between the adjacent LED light sources 84.

Light rays emitted from each LED light source 84 are collimated by the lens cut portion 85 and enter the light guide body 80. The light rays having entered are internally (totally) reflected by the light reflection portion 82, and the reflected light rays are allowed to exit to the outside through the partial region 83a of the light exit surface 83 corresponding to the LED light source 84.

In this case, the through slit 86 extending within the light guide body 80 functions to prevent the light rays emitted from each LED light source 84 from exiting through a region other than the partial region 83a corresponding to the LED light source 84. This can be achieved by reflecting (totally reflecting) the light rays of oblique components other than parallel components out of the light rays emitted from the respective LED light sources 84 and introduced into the light guide body 80 to prevent the light rays from the respective LED light sources 84 from being mixed with one another.

At the same time, the through slit 86 has a function of giving a transmission loss to the reflected light internally reflected (totally reflected) by the light reflection portion 82 corresponding to the optical path length (light guide length) of the light rays emitted from each LED light source 84 and guided through the light guide body 80, thereby achieving uniformity of the luminance of the light rays exiting through the respective partial regions 83a.

Incidentally, the through slit 86 extending in the light guide body 80 is merely a slit (groove) that extends along the parallel light introduced into the light guide body 80 and penetrates the light guide body 80 in the thickness direction, and no effective countermeasure is taken to cover the disadvantage among the optical merits and demerits caused by the presence of the through slit 86. Therefore, it is difficult to say that the configuration of the through slit 86 provided in the light guide body 80 is optically suitable and sufficient.

SUMMARY

The presently disclosed subject matter was devised in view of these and other problems and features in association with the conventional art. An object according to an aspect of the presently disclosed subject matter is to provide a vehicular light having a light guide body which is configured to take in light from an LED light source and form a desired emission pattern (display pattern) by light guide control, and which has a good appearance at the time of lighting by realizing the light guide body which fulfills an excellent optical function.

According to another aspect of the presently disclosed subject matter, a vehicular light includes: a plurality of LED light sources; and a light guide body configured to take in and guide light rays from each of the plurality of LED light sources and cause the guided light rays to exit therefrom. In this vehicular light, the light guide body has: a light incident portion configured to receive light rays from each of the plurality of LED light sources so that entered light rays are as substantially parallel light rays, a light guide portion configured to guide the respective substantially parallel light rays taken from the light incident portion in the same direction, a light reflection portion configured to internally reflect the light rays guided by the light guide portion toward a light exit portion having a light exit surface, and the light exit portion configured to allow the light rays reflected by the light reflection portion to exit toward the outside. Furthermore, the light guide portion is provided with at least one slit extending along a light guiding direction of the substantially parallel light rays, and the slit is formed to penetrate the light guide portion in its thickness direction and linearly extend along the light exit surface between a position corresponding to an LED light source located closest to the light exit surface of the light guide portion and a position corresponding to an LED light source adjacent thereto among the plurality of the LED light sources, while being formed within a predetermined length range from the LED light source side.

Further, according to another aspect of the presently disclosed subject matter, the vehicular light with the aforementioned configuration may be configured such that the slit is provided between respective light guide paths through which the substantially parallel light rays are guided adjacent to each other within the light guide portion.

Further, according to still another aspect of the presently disclosed subject matter, the vehicular light with any of the aforementioned configurations may be configured such that the slit has a tapered width region formed in a range of a predetermined length from the LED light source side and gradually narrowing in width, and a distal end surface with a curved surface shape forming a distal end portion of the tapered width region.

Further, according to still another aspect of the presently disclosed subject matter, the vehicular light with any of the aforementioned configurations may be configured such that the light guide portion is a flat plate-shaped member with a substantially triangular shape, and portions corresponding to respective sides of the triangular shape serve as the light incident portion, the light reflection portion, and the light exit portion, respectively, and the light incident portion and the light exit portion are located at positions where a right angle is sandwiched therebetween, and the light reflection portion is located at a position of an oblique side of the triangle shape. In this configuration, the slit may be provided along the light exit portion.

Further, according to still another aspect of the presently disclosed subject matter, the vehicular light with any of the aforementioned configurations may he configured such that the slit has side walls at least one of which is subjected to a light diffusion treatment.

According to the presently disclosed subject matter, the light guide portion of the light guide body is provided with a slit penetrating the light guide portion in the thickness direction thereof along the light guide path of the light rays emitted from the plurality of LED light sources and guided in the light guide portion, and the slit is configured to have the tapered width region formed in the range of a predetermined length from the side of the LED light sources and gradually narrowing in width, and the distal end surface with the curved surface shape forming the distal end portion of the tapered width region.

This suppresses the reflection of the shadow of the slit on the light reflection portion of the light guide portion of the light guide body to suppress the decrease in the amount of light reaching the light reflection portion, thereby preventing the generation of dark portions (dark areas) in the exiting light rays. As a result, it is possible to provide a vehicular light which has a good appearance at the time of lighting by realizing a light guide body which fulfills excellent optical functions.

BRIEF DESCRIPTION OF DRAWINGS

These and other characteristics, features, and advantages of the presently disclosed subject matter ill become clear from the following description with reference to the accompanying drawings, wherein:

FIG. 6A is an optical path diagram of light rays guided in the light guide body;

FIG. 23 is a luminance distribution diagram when all the LEI) light sources are turned on;

DESCRIPTION OF EXEMPLARY EMBODIMENTS

A description will now be made below to vehicular lights of the presently disclosed subject matter with reference to the accompanying drawings in accordance with exemplary embodiments.

Figure 1:
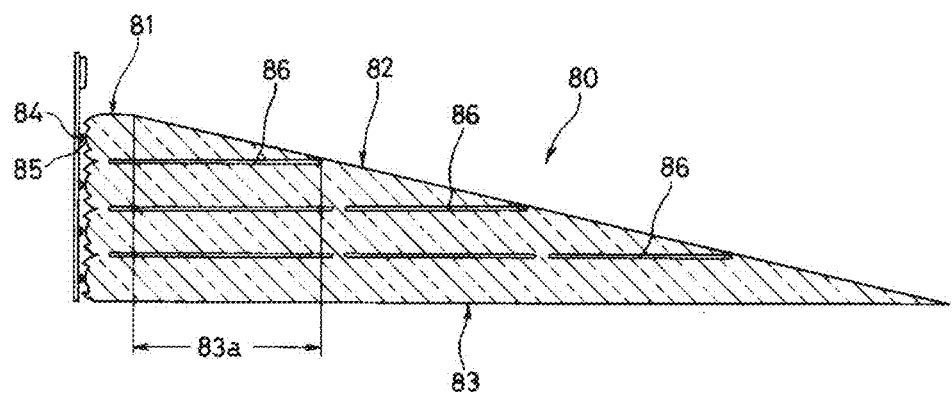
FIG. 1 is a diagram illustrating a conventional light guide body.
Figure 2:
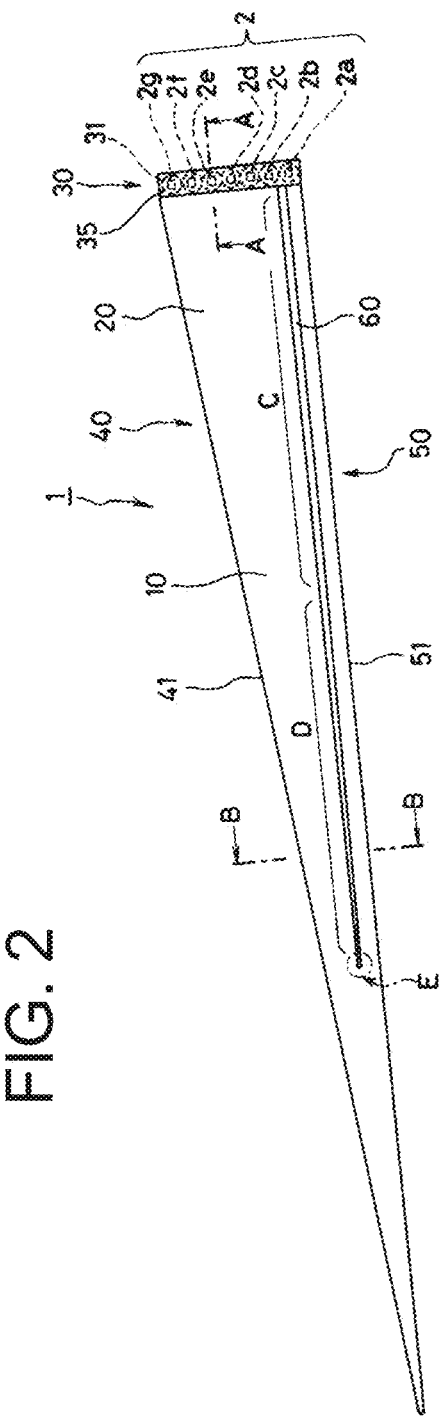
FIG. 2 is a plan view of a light guide optical system constituting a vehicular light made in accordance with principles of the presently disclosed subject matter.
Figure 3:
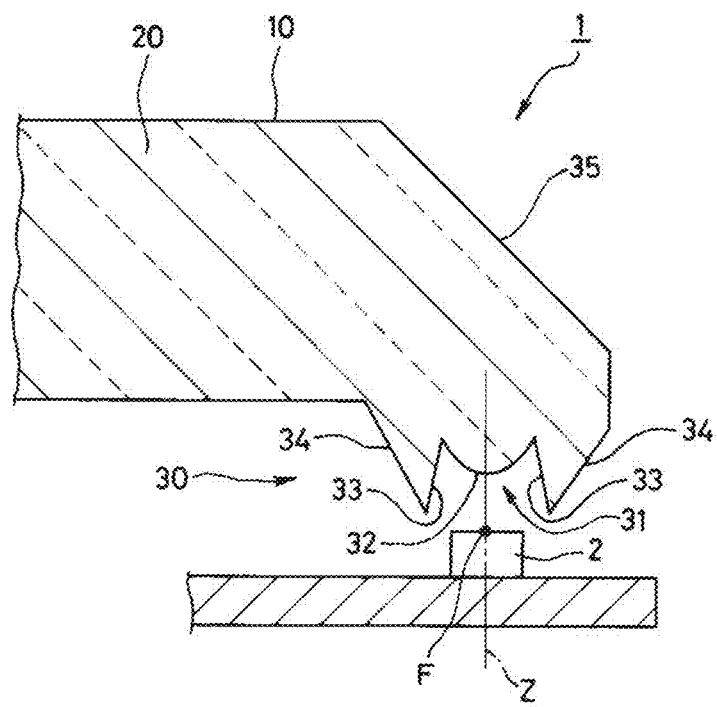
FIG. 3 is a cross-sectional view of the light guide optical system taken along line A-A of FIG. 2.
Figure 4:
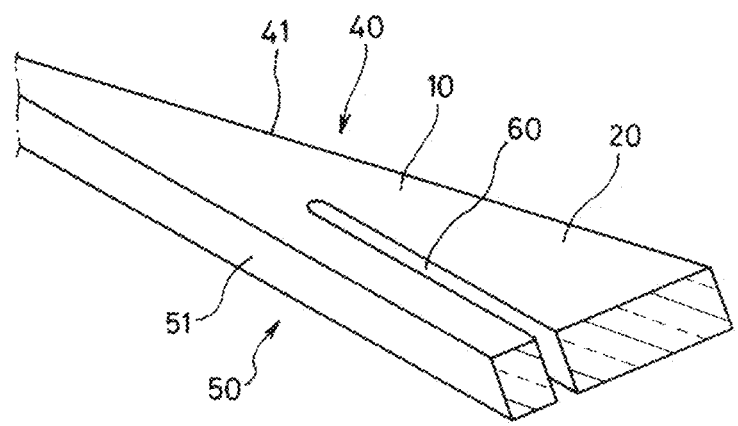
FIG. 4 is a perspective view of the light guide optical system taken along line B-B of FIG. 2.
Figure 5:
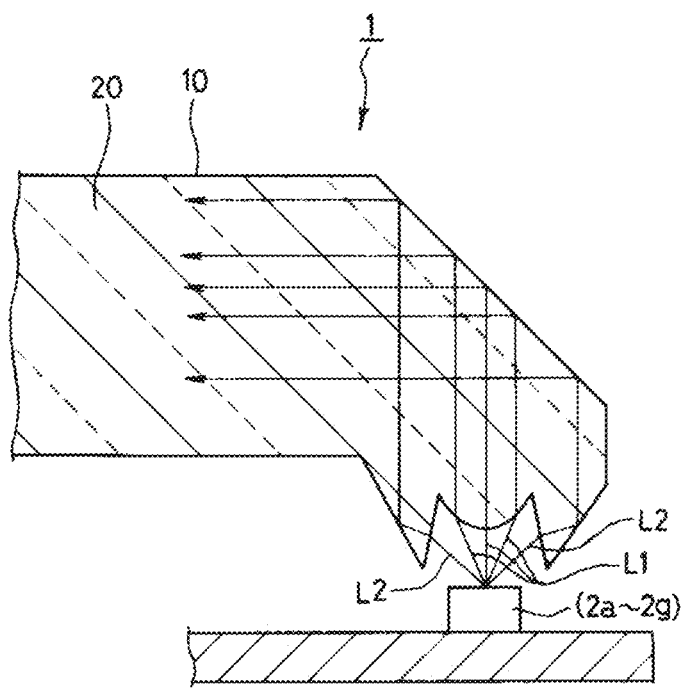
FIG. 5 is an optical path diagram illustrated using FIG. 3.

FIG. 2 is a plan view of a light guide optical system constituting the vehicular light made in accordance with the principles of the presently disclosed subject matter, FIG. 3 is a cross-sectional view of the same taken along line A-A of FIG. 2, FIG. 4 is a perspective view of the same taken along line B-B of FIG. 2, and FIG. 5 is an optical path diagram illustrated using FIG. 3.

The light guide optical system 1 includes a plurality of light sources 2 which are LED light sources and a light guide body 10 formed of a transparent member.

The light guide body 10 includes a flat plate-shaped light guide portion 20 having a substantially triangular shape, and a light incident portion 30, a light reflection portion 40, and a light exit portion 50 which are located at respective sides of the substantially triangular shape of the light guide portion 20.

The light incident portion 30 is formed to be bent at a substantially right angle with respect to the triangular surface of the light guide portion 20 (in the thickness direction), and has a plurality of light incident/reflection surfaces 31 on the distal end surface thereof, and an inclined reflection surface (second light reflection surface) 35 (see FIG. 3). The light incident/reflection surfaces 31 are configured to receive light rays emitted in a substantially radial manner from the respective LED light sources 2, which include seven LED light sources 2a to 2g in the present exemplary embodiment and are arranged to face the distal end surface of the light incident portion 30, so as to convert the light rays into substantially parallel light rays. The inclined reflection surface 35 is formed at a position facing the plurality of light incident/reflection surfaces 31 and configured to direct light rays that have been substantially collimated by respective light incident/reflection surfaces 31 toward a plane direction of the light guide portion 20. The plane direction used herein means a direction in which the triangular surface (plane) of the light guide portion 20 extends.

The light incident/reflection surfaces 31 are formed at respective positions corresponding to the plurality of LED light sources 2a to 2g that are arranged at predetermined intervals, and are each configured to have a first light incident surface 32, a second light incident surface 33, and a first light reflection surface 34.

The first light incident surface 32 is positioned so as to cover the LED light source 2 facing the light incident/reflection surface 31 from above, and is formed of a hyperbolic surface protruding toward the LED light source 2 and obtained by rotating a hyperbolic curve around its main axis which coincide with the optical axis Z of the LED light source 2 so that the hyperbolic curve has a focal position located at the LED light source 2, or an aspheric surface that is similar to the hyperbolic surface. The first light incident surface 32 has a function of receiving light rays L1 emitted from the LED light source 2 and converting them into substantially parallel light rays to direct them to the second light reflection surface 35 located upward (see FIGS. 3 and 5).

The second light incident surface 33 is positioned so as to surround the first light incident surface 32 from the side thereof, and is formed to have a substantially cylindrical shape extending from the upper edge portion (edge portion on the side closer to the second light reflection surface 35) of the first light incident surface 32 downward beside the first light incident surface 32 toward the side opposite to the second light reflection surface 35. The second light incident surface 33 has a function of receiving light rays L2 emitted from the LED light source 2 and directing them to the first light reflection surface 34 positioned sideward of the second light incident surface 33 (see FIGS. 3 and 5).

The first light reflection surface 34 is formed of an annular inclined surface that opens outwardly from the lower edge of the second light incident surface 33 upward beside the second light incident surface 33. The first light reflection surface 34 has a function of internally reflecting (totally reflecting) the light rays L2 having been emitted from the LED light source 2 and entered the light guide body 10 through the second light incident surface 33 thereof to direct the light rays L2 toward the second light reflection surface 35 as light rays that are substantially parallel to the light rays (substantially parallel light rays) L1 having entered through the first light incident surface 32 (see FIGS. 3 and 5).

The second light reflection surface 35, which is positioned above the light incident/reflection surface 31, is formed of an inclined surface inclined toward the light guide portion 20 at an angle of approximately 45 degrees upward with respect to the optical axis Z of the LED light source 2, and has a function of internally reflecting (totally reflecting) the light rays L1 and L2 emitted from each LED light source 2 facing each of the plurality of light incident/reflection surfaces 31 and approximately collimated by the light incident/reflection surface 31 to direct them toward the plane direction of the light guide portion 20 (in the left direction in FIG. 5).

Figure 6B:
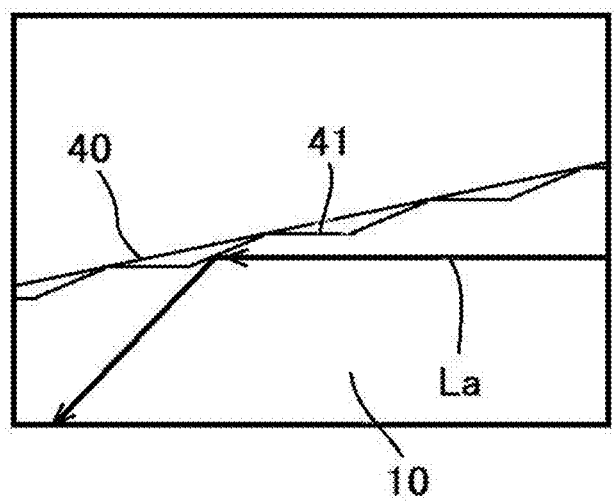
FIG. 6B is a schematic enlarged view illustrating a part of a light reflection portion 40 in FIG. 6A.

The light reflection portion 40 and the light exit portion 50 have a third light reflection surface 41 and a light exit surface 51, respectively, which are formed by end surfaces of the flat plate-shaped light guide portion 20 of the light guide body 10. Here, FIG. 6B shows a schematic enlarged view of a part of the light reflection portion 40 in FIG. 6A.

As illustrated in the drawing, the third light reflection surface 41 of the light reflection portion 40 is provided with a reflection element (stepped reflection surfaces). This configuration can adjust the total-reflection direction to a specified direction so that the reflected light rays can reach the intended light exiting regions, which will be described later.

The light exit surface 51 extends in a direction substantially orthogonal to the direction in which the plurality of light incident/reflection surfaces 31 are formed, in other words, substantially orthogonal to the direction in which the LED light sources 2 corresponding to the light incident/reflection surfaces 31 are arranged. Therefore, the light guide body 10 has a substantially right-angled triangular shape with the light incident portion 30 and the light exit portion 50 sandwiching a right angle and the light reflection portion 40 corresponding to an oblique side of the right-angled triangle.

The light guide portion 20 of the light guide body 10 is provided with a slit 60 extending linearly along the light exit surface 51 and located between the LED light source 2a closest to the light exit surface 51 and the LED light source 2b adjacent thereto.

The slit 60 is formed of a penetration groove having a predetermined width and penetrating the light guide portion 20 in the thickness direction, and is composed of three regions including a constant width region C, a tapered width region (width-change region) and a distal end region E. The constant width region C has a constant groove width formed in a range of a predetermined length from the base end (end on the side of the LED light source 2) toward the distal end. The tapered width region D has a groove width formed in a range of a predetermined length from the end of the constant width region A toward the distal end and gradually narrowing toward the distal end (opposite side of the LED light source 2). The distal end region E has a distal end of a curved surface shape formed in the distal end portion of the tapered width region D.

Herein, the slit 60 is formed to extend with a certain length (the predetermined length range) from the base end to the midpoint of the light guide portion 20. Before describing this, a brief summary of the optical system of the light guide body 10 will be given. As illustrated in FIG. 6A, the light rays emitted from the respective LED light sources 2a to 2g can enter the light guide body 10 through the corresponding light incident/reflection surfaces 31 of the light incident portion 30 and be internally reflected by the second light reflection surface 35 and then by the light reflection portion 40, and finally exit through the light exit portion 50. At this time, the light rays emitted from the respective LED light sources 2a to 2g can be considered to be internally reflected by respective predetermined regions 41a to 41g of the light reflection portion 40 and then exit through respective predetermined regions 51a to 51g of the light exit portion 50 corresponding to the regions 41a to 41g of the light reflection portion 40. Hereinafter, these regions 41a to 41g may sometimes be referred to as light reflection surfaces 41a to 41g, and the regions 51a to 51g may sometimes be referred to as light exit surfaces 51a to 51g, as appropriate, in order to describe the length of the slit 60 to be formed.

In the illustrated exemplary embodiment, although the predetermined length of the slit 60 is designed to be up to the light exit surface (region) 51d through which the light rays of the LED light source 2d having been guided exit (see FIG. 6A), if the slit 60 is formed to extend beyond the light exit surface (region) 51c and up to a position between the light exit surface (region) 51b and the light exit surface (region) 51c, a dark portion generated between the light exit surface 51a and the light exit surface 51b becomes conspicuous. In view of this, the slit 60 is preferably formed to extend up to the light exit surface (region) 51c. Furthermore, in the case of the present exemplary embodiment, the brightness of the dark portion generated between the light exit surface (region) 51a and the light exit surface (region) 51b can be adjusted by adjusting the distal end portion of the tapered width region D of the slit 60 so as to be positioned between the light exit surface 51d through which the guided light rays of the LED light source 2d exit and the light exit surface 51c through which the guided light rays of the LED light source 2c exit. Furthermore, depending on the total length of the light exit surface 51 and the angle of the light reflecting surface 41, it is necessary to adjust the distal end portion of the tapered width region D of the slit 60 so as to be positioned between the light exit surface 51e through which the guided light rays of the LEI) light source 2e exit and the light exit surface 51c through which the guided light rays of the LED light source 2c exit.

Further, when the total length of the light guide body 10 in the longitudinal direction is shorter than that of the present exemplary embodiment and the number of LED light sources is small, the constant width region C of the slit 60 may be omitted, and only the tapered width region D may be formed from the base end instead.

The LED light source 2 (2a to 2g) used may be produced by mounting a bare chip on a base material (for example, a printed circuit board) or mounting a bare chip coated with a translucent member (for example, an epoxy resin) on a base material when the light rays emitted from an LED element (bare chip) serving as a light-emitting source is used as they are.

When light rays having a hue different from that of light rays emitted from an LED element are used, an LED element used may be produced by coating a bare chip with a translucent member in which a fluorescent substance is dispersed and mounting the resulting chip on a base material.

In this case, for example, a blue LED element that emits blue light may be used as a light-emitting source, and a yellow fluorescent material may be used as a fluorescent material that is excited by the blue light from the blue LED element and accordingly emits yellow light having a wavelength longer than the wavelength of blue light and becoming the complementary color of blue light. By doing so, it is possible to obtain light of a hue approximating to white light by additive color mixing of part of blue light emitted from the blue LED element and yellow light emitted from the yellow fluorescent material excited by another part of blue light from the blue LED element.

Further, instead of the yellow fluorescent material, a mixed fluorescent material of a green fluorescent material which is excited by blue light emitted from a blue LED element and emits wavelength-converted green light and a red fluorescent material which is excited by blue light emitted from a blue LED element and emits wavelength-converted red light may be used. By doing so, it is also possible to obtain pseudo white light by additive color mixing of part of blue light emitted from the blue LED element, green light emitted from the green fluorescent material excited by another part of blue light from the blue LED element, and red light from the red fluorescent material excited by another part of blue light from the blue LED element.

Further, depending on the use application of the vehicular light, light of various hues other than white light can be obtained by appropriately combining the wavelength of light emitted from an LED element and the type of the fluorescent material. It is also possible to combine an ultraviolet LED element that can emit ultraviolet light and a fluorescent material corresponding thereto.

Next, an optical path formation of the light guide optical system 1 composed of seven LED light sources 2 (2a to 2g) and the light guide body 10 will be described with reference to the optical path diagram of FIG. 6A. In the following description, a case where there is no slit formed in the light guide body will be described first although a description will be given with reference to the reference numbers in FIG. 6A that shows the slit formed in the light guide body.

Light rays (La to Lg) emitted substantially radially from each of the LED light sources (2a to 2g) are impinge on each of the light incident/reflection surfaces 31 of the light incident portion 30 and converted into substantially parallel light rays by the same as described above and enters the light guide body 10. Then, the light rays are guided through the light guide body 10 and internally reflected (totally reflected) by the second light reflection surface 35 positioned above toward the plane direction of the light guide portion 20.

The light rays (La to Lg) directed by the second light reflection surface 35 in the plane direction of the light guide portion 20 are guided through the light guide portion 20 in a direction substantially parallel to the light exit surface 51 of the light exit portion 50 in the light guide portion 20 to reach each of the predetermined regions (41a to 41g) of the third light reflection surface 41 of the light reflection portion 40. Then, the light rays (La to Lg) are internally reflected (totally reflected) by the third light reflection surface 41 and are further guided through the light guide portion 20 to reach each of the predetermined regions (51a to 51g) of the light exit surface 51 of the light exit portion 50 and exit therethrough to the outside.

At this time, each part of the light rays (La to Lg) directed to the plane direction of the light guide portion 20 by the second light reflection surface 35 is guided toward the third light reflection surface 41 of the light reflection portion 40 as substantially parallel light rays in the light guide portion 20. However, the spread of the light rays guided therethrough increases with the longer traveling distance of light along the light guide optical path length.

Therefore, in the case where the size of the light guide body 10 is large and the length of the light guide portion 20 is long, in other words, in the case where the light guide optical path length to the third light reflection surface 41 is long, a region in which adjacent guided light rays among the light rays (La to Lg) guided in the light guide portion 20 are mixed with each other at a boundary (intermediate) therebetween becomes large. Accordingly, a region in which adjacent exiting light rays among the exiting light rays (La to Lg) projected toward the outside from the light exit surface 51 of the light exit portion 50 are mixed with each other at a boundary therebetween also becomes large.

Under this situation, suppose the case where there is no slit formed in the light guide body and the aforementioned phenomenon occurs in this light guide body, for example. With such a light guide body, when the LED light sources 2 that emit the respective light rays (La to Lg) to be projected from the plurality of predetermined exit regions (51a to 51g) of the light exit surface 51 of the light exit portion 50 are sequentially turned on or turned off in accordance with a driving method of a sequential lighting/turning-off mode, since the region in which the emitted light rays adjacent to each other among the plurality of emitted light rays (La to Lg) are mixed with each other at the boundary therebetween becomes large, each of the plurality of emitted light rays (La to Lg) deteriorates in clarity (sharpness), resulting in poor sequential feeling at the time of driving as a vehicular light.

In view of this problem, in the light guide optical system 1 of the exemplary embodiment, the slit 60 is provided in the light guide portion 20 of the light guide body 10 constituting the light guide optical system 1 along the boundary (intermediate) between the light guide path region of the guided light rays La traveling along the longest light guide path length among the guided light rays (La to Lg) and the light guide path region of the guided light rays Lb. With this configuration, the guided light rays La are prevented from spreading to the side closer to the guided light rays Lb, and at the same time, the guided light rays Lb are prevented from spreading toward the guided light rays La.

As a result, among the exiting light rays (La to Lg) projected through the plurality of predetermined light exit regions (51a to 51g) of the light exit surface 51 of the light exit unit 50, the exiting light rays La having the widest area where the exiting light rays are mixed with each other at the boundary and the exiting light rays Lb are prevented from being mixed, whereby the clarity (sharpness) of the exiting light rays La and the exiting light rays Lb is improved, and the sequential feeling at the time of driving as a vehicular light can be obtained satisfactorily.

However, when the slit 60 is provided in the light guide portion 20, the light rays reaching the region (H) of the third light reflection surface 41 of the light reflection portion 40 where the slit 60 is assumed to be extended and reach (see FIGS. 7 and 8) decreases due to the reflection of the shadow of the slit 60, and thus, a dark portion (dark area) is generated at the boundary between the exiting light rays La and the exiting light rays Lb in the exiting light rays through the light exit surface 51 of the light exit portion 50.

Therefore, in the present exemplary embodiment, the generation of the dark areas is prevented by providing the slit 60 with an appropriate shape to cope with the above-mentioned problem.

Specifically, as described above, the slit 60 is provided with a region D, i.e., a tapered width region (width-change region) D in which the groove width gradually decreases toward the distal end side (opposite side to the LED light source 2) in a range of a predetermined length from the constant width region A toward the distal end side.

Figure 7:
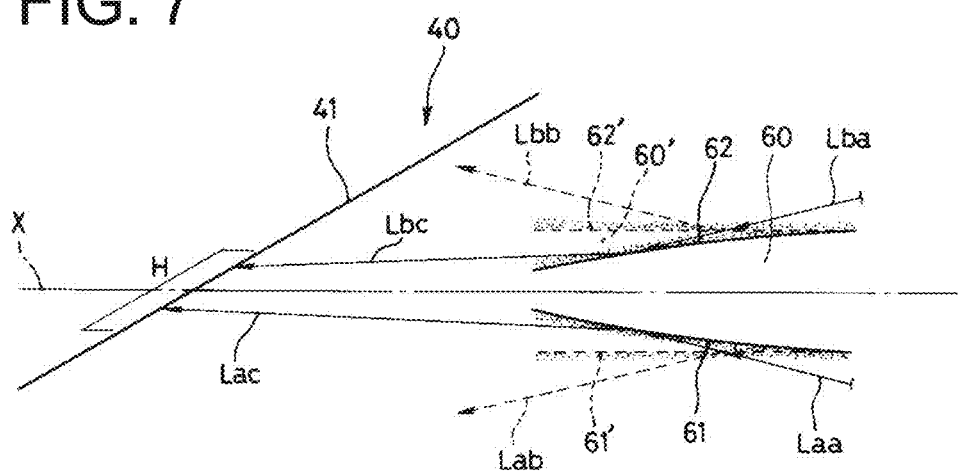
FIG. 7 is a plan view illustrating optical function of a slit provided to the light guide body.

If the entire length of the slit 60' has a constant width (shape indicated by a broken line) as shown in FIG. 7, light rays Laa spreading laterally among the guided light rays La toward the one side wall 61' of the slit 60' is internally reflected (totally reflected) by the one side wall 61' and travels away from the extending direction of the slit 60' (away from the central axis X along the extending direction) (indicated by Lab with the broken line in the drawing), while light rays Lba spreading laterally among the guided light rays Lb toward the other side wall 62' of the slit 60' is internally reflected (totally reflected) by the side wall 62' and travels away from the extending direction of the slit 60' (away from the central axis X along the extending direction) (indicated by Lbb with the broken line in the drawing).

On the other hand, when the slit 60 is provided with the tapered width region (shape indicated by a solid line) as described above, the light rays Laa spreading laterally among the guided light rays La toward the one side wall 61 of the slit 60 is internally reflected (totally reflected) by the side wall 61 in a direction approaching the extending direction (approaching the central axis X along the extending direction) of the slit 60 (indicated by Lac with the solid line in the drawing), while the light rays Lbb spreading laterally among the guided light rays Lb toward the other side wall 62 of the slit 60 is internally reflected (totally reflected) by the side wall 62 in a direction approaching the extending direction (approaching the central axis X along the extending direction) of the slit 60 (indicated by Lbc with the solid line in the drawing).

When the case where the slit 60' is formed with a constant width over the entire length thereof and the case where the tapered width region is gradually narrowed toward the tip side of the slit 60 are compared with each other, the provision of the tapered width region can increase the amount of the light rays that reach the region (H) of the third light reflection surface 41 of the light reflection portion 40 where the slit 60 is assumed to be extended and reach while the reflection of shadow of the slit 60 by the guided light rays Laa and the guided light rays Lba to the region (H) is suppressed.

Figure 8:
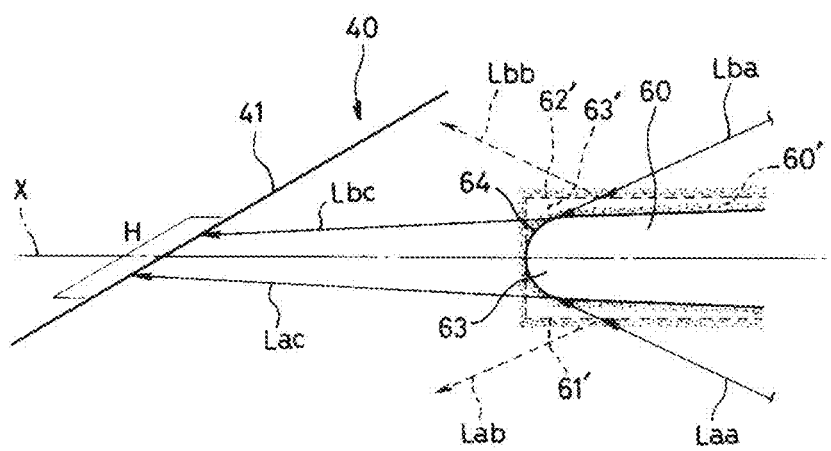
FIG. 8 is a plan view illustrating the optical function of a slit provided to the light guide body.

At the same time, as described above, the slit 60 is provided with a region (distal end region E) having the distal end of the curved surface shape formed at the distal end portion of the tapered width region (see FIG. 8). In other words, the shape of the distal end portion of the slit 60 is formed in a curved surface shape.

If the shape of the distal end portion 63' of the slit 60' is a rectangular shape (the shape indicated by the broken line) as shown in FIG. 8, the light rays Laa spreading laterally among the guided light rays La toward the distal end portion 63' of the slit 60' is internally reflected (totally reflected) by the one side wall 61' and travels away from the extending direction of the slit 60' (away from the central axis X along the extending direction) (indicated by Lab with the broken line in the drawing), while the light rays Lba spreading laterally among the guided light rays Lb toward the distal end portion 63' of the slit 60' is internally reflected (totally reflected) by the other side wall 62' and travels away from the extending direction of the slit 60' (away from the central axis X along the extending direction) (indicated by Lbb with the broken line in the drawing).

On the other hand, when the shape of the distal end portion of the slit 60 is the curved surface shape (the shape indicated by the solid line), the light rays Laa spreading laterally among the guided light rays La toward the distal end portion 63 of the slit 60 is internally reflected (totally reflected) on the distal end surface 64 in a direction approaching the extending direction of the slit 60 (approaching the central axis X along the extending direction) (indicated by Lac with the solid line in the drawing), while the light rays Lba spreading laterally among the guided light rays Lb toward the distal end portion 63 of the slit 60 is internally reflected (totally reflected) on the distal end surface 64 in a direction approaching the extending direction (approaching the central axis X along the extending direction) of the slit 60 (indicated by Lbc with the solid line in the drawing).

When the case where the shape of the distal end portion 63' of the slit 60' is the rectangular shape and the case where the shape of the distal end portion 63 of the slit 60 is the curved surface shape are compared with each other, the curved surface shape of the distal end portion 63 of the slit 60 can increase the amount of the light rays that reach the region (H) of the third light reflection surface 41 of the light reflection portion 40 where the slit 60 is assumed to be extended and reach while the reflection of shadow of the distal end portion 63 of the slit 60 by the guided light rays Laa and the guided light rays Lba to the region (H) is suppressed.

As a result, in particular, light rays in which the generation of the dark area is suppressed are projected at the boundary between the exiting light rays La and the exiting light rays Lb from the light exit surface 51 of the light exit portion 50. Thus, the clarity (sharpness) of the exiting light rays (La to Lg) is improved, and the sequential feeling at the time of driving as a vehicular light can be obtained satisfactorily. In addition, when the light rays (La to Lg) are all emitted, a linear (band-like) display having no dark areas is available.

In addition, the provision of the slit 60 at the boundary (intermediate) between the light guide path of the guided light rays La having the longest light guide path length and the light guide path of the guided light rays Lb can confine the guided light rays La and the guided light rays Lb in the respective light guide paths and guide the light rays, as well as it can reduce the light guide loss of the guided light rays La and the guided light rays Lb.

As a result, a decrease in the amount of light (luminance) of the exiting light rays La and the exiting light rays Lb projected from the light exit surface 51 of the light exit portion 50 is suppressed.

At the same time, the provision of the slit 60 on the side of the LED light source 2 can control the amount of light by causing reflected light having a relatively large amount of light internally reflected (totally reflected) by the third light reflection surface 41 of the light reflection portion 40 at a position close to the LED light source (2e to 2g) to be transmitted through the slit 60, whereby the light rays controlled in light amount can be projected toward the outside through the light exit surface 51 of the light exit portion 50.

As a result, it is possible to perform sequential display with high luminance and high luminance uniformity by all the exiting light rays (La to Lg) composed of the exiting light rays (La to Lc) guided by suppressing the light guiding loss in the long light guide path and the exiting light rays (Ld to Lg) whose light amount is controlled by passing through the slit 60 provided in the light guide path.

Note that any one of the side walls 61 and 62 of the slit 60 may be subjected to a light diffusion treatment. By doing so, it is possible to control the luminance (amount of light) of the light rays reflected by the third light reflection surface 41 of the light reflection portion 40, transmitted through the slit 60, and projected to the outside from the light exit surface 51 of the light exit portion 50. As a result, it is possible to achieve luminance uniformity of each of the exiting light rays (La to Lg) projected through the light exit surface 51 of the light exit portion 50.

FIGS. 9 to 22 show the results of verifying the appearance of the exiting light rays (La to Lg) when the LED light sources (2a to 2g) are sequentially turned on (by sequential lighting control) from the LED light source 2a to the LED light source 2g in this order, respectively, by optical simulation in the light guide optical system 1 having the aforementioned configuration.

Figure 9:
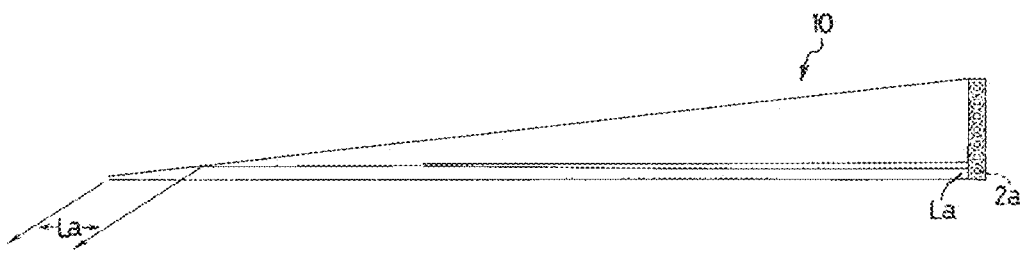
FIG. 9 is an optical path diagram of light rays emitted from an LED light source (2a) in the light guide body.
Figure 10:
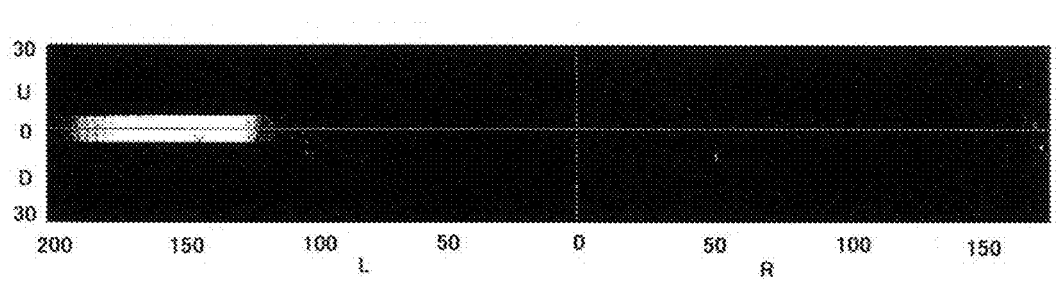
FIG. 10 is a diagram illustrating an emission pattern of light exiting through the optical path of FIG. 9.
Figure 11:
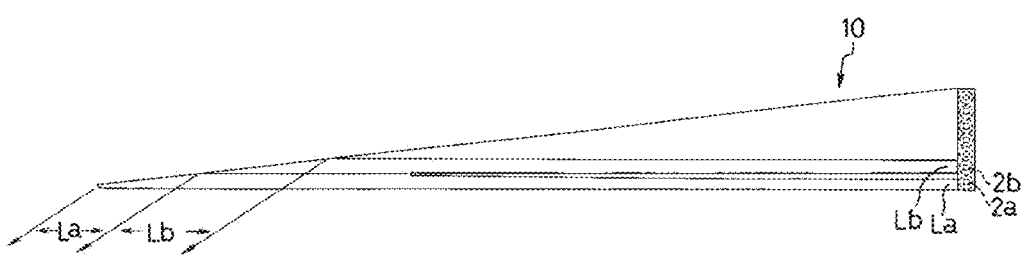
FIG. 11 is an optical path diagram of light rays emitted from LED light sources (2a to 2b) in the light guide body.
Figure 12:
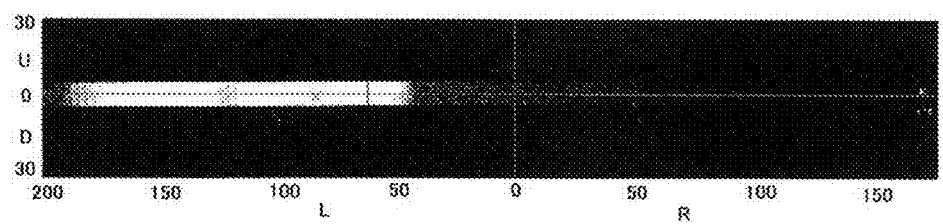
FIG. 12 is a diagram illustrating an emission pattern of light exiting through the optical paths of FIG. 11.
Figure 13:
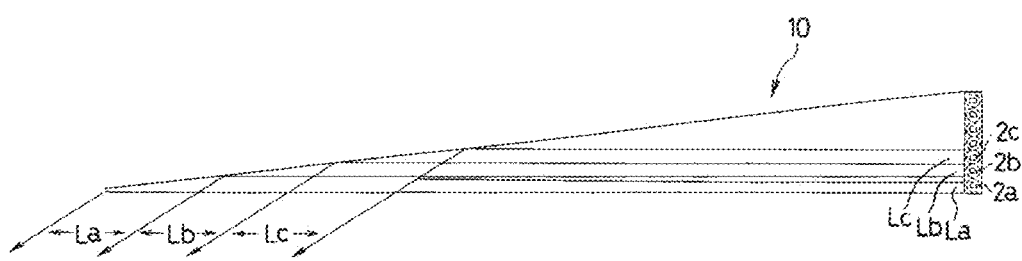
FIG. 13 is an optical path diagram of light rays emitted from LED light sources (2a to 2c) in the light guide body.
Figure 14:
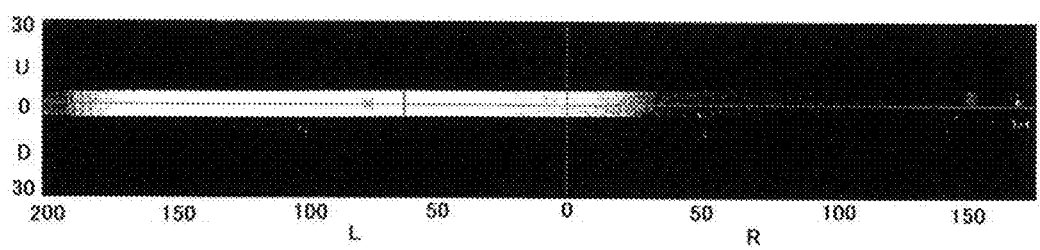
FIG. 14 is a diagram illustrating an emission pattern of light exiting through the optical paths of FIG. 13.
Figure 15:
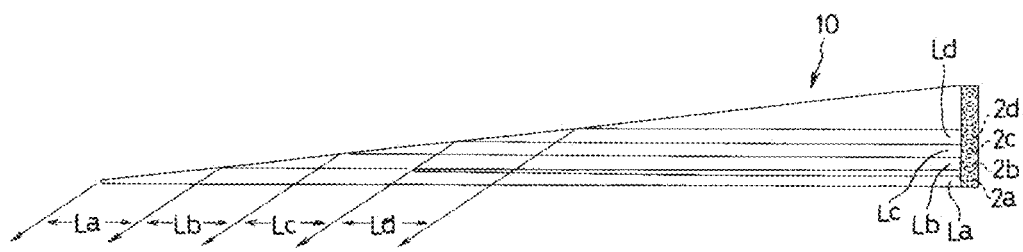
FIG. 15 is an optical path diagram of light rays emitted from LED light sources (2a to 2d) in the light guide body.
Figure 16:
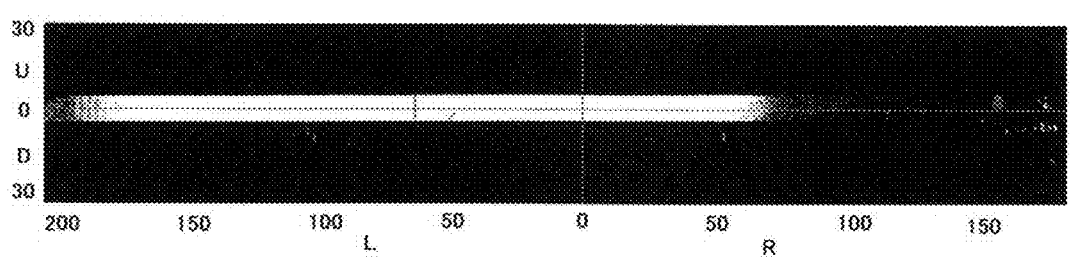
FIG. 16 is a diagram illustrating an emission pattern of light exiting through the optical paths of FIG. 15.
Figure 17:
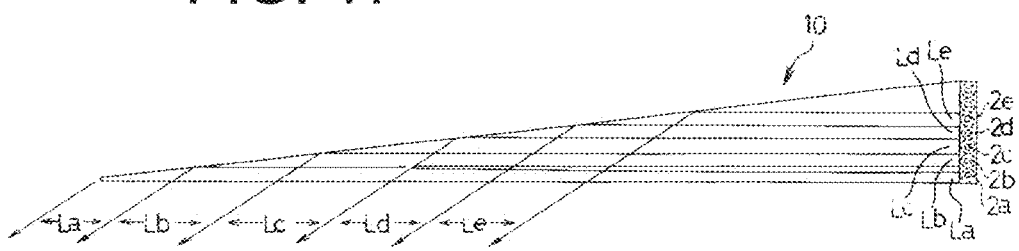
FIG. 17 is an optical path diagram of light rays emitted from LED light sources (2a to 2e) in the light guide body.
Figure 18:
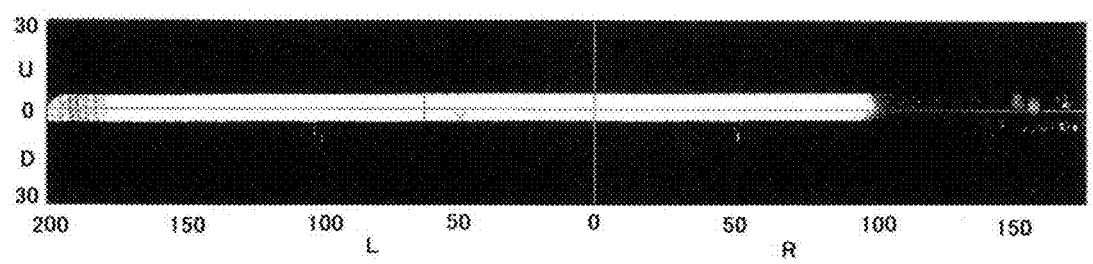
FIG. 18 is a diagram illustrating an emission pattern of light exiting through the optical paths of FIG. 17.
Figure 19:
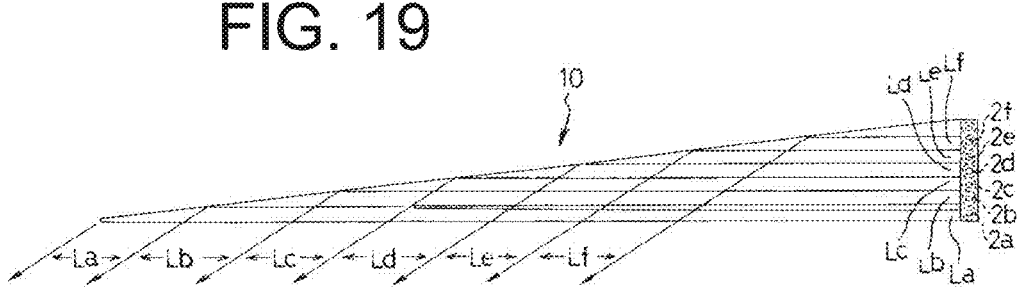
FIG. 19 is an optical path diagram of light rays emitted from LED light sources (2a to 2f) in the light guide body.
Figure 20:
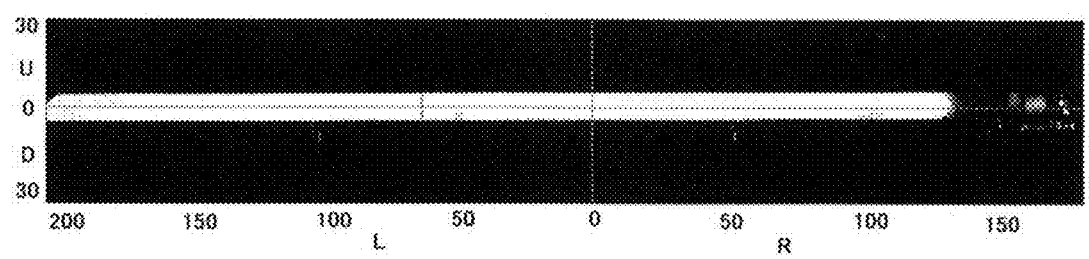
FIG. 20 is a diagram illustrating an emission pattern of light exiting through the optical paths of FIG. 19.
Figure 21:
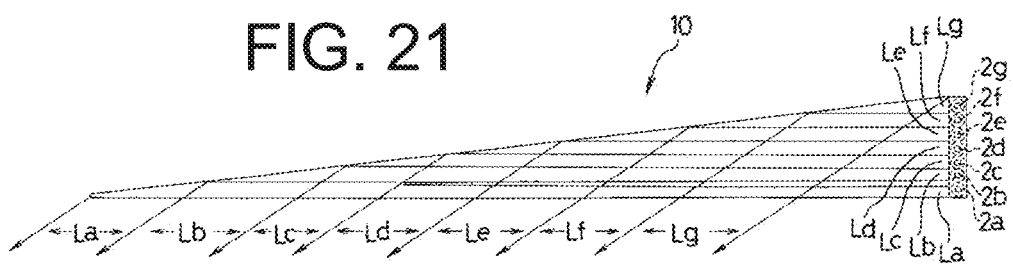
FIG. 21 is an optical path diagram of light rays emitted from LEI) light sources (2a to 2g) in the light guide body.
Figure 22:
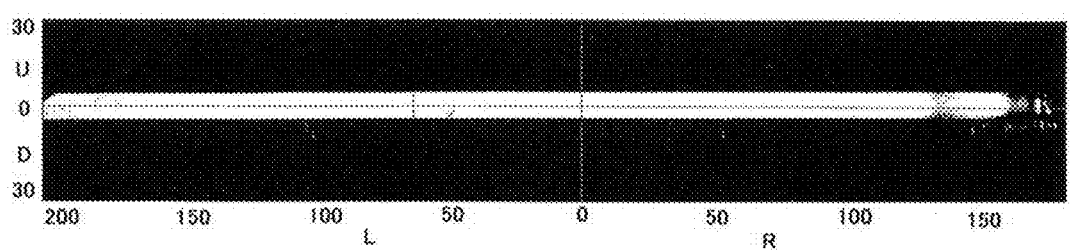
FIG. 22 is a diagram illustrating an emission pattern of light exiting through the optical paths of FIG. 21.

FIG. 9 is an optical path diagram of the light guide body 10 when the LED light source 2a is turned on, and FIG. 10 is an optical simulation result illustrating how the light rays projected from the light guide body 10 are observed at that time. Similarly, FIG. 11 is an optical path diagram of the light guide body 10 when the light sources 2a and 2b are turned on, and FIG. 12 is an optical simulation result illustrating how the light rays projected from the light guide body 10 are observed at that time. FIG. 13 is an optical path diagram of the light guide body 10 when the LED light sources 2a, 2b, and 2c are turned on, and FIG. 14 is an optical simulation result illustrating how the light rays projected from the light guide body 10 are observed at that time. FIG. 15 is an optical path diagram of the light guide body 10 when the LED light sources 2a, 2b, 2c, and 2d are turned on, and FIG. 16 is an optical simulation result illustrating how the light rays projected from the light guide body 10 are observed at that time. FIG. 17 is an optical path diagram of the light guide body 10 when the LED light sources 2a, 2b, 2c, 2d, and 2e are turned on, and FIG. 18 is an optical simulation result illustrating how the light rays projected from the light guide body 10 are observed at that time. FIG. 19 is an optical path diagram of the light guide body 10 when the LED light sources 2a, 2b, 2c, 2d, 2e, and 2f are turned on, and FIG. 20 is an optical simulation result illustrating how the light rays projected from the light guide body 10 are observed at that time. FIG. 21 is an optical path diagram of the light guide body 10 when the LED light sources 2a, 2b, 2c, 2d, 2e, 2f, and 2g are turned on, and FIG. 22 is an optical simulation result illustrating how the light rays projected from the light guide body 10 are observed at that time.

From the results of the aforementioned optical simulation (FIGS. 10, 12, 14, 16, 18, 20, and 23), it can be seen that in any of the drawings, the blurring of the exiting light rays is small at the distal end portion and the outline is clearly formed, and the dark portion (dark area) is not seen at the joint portions of the exiting light rays (La to Lg), and the emission pattern of the band shape (linear shape) with uniform luminance (no luminance unevenness) is realized.

Figure 23:
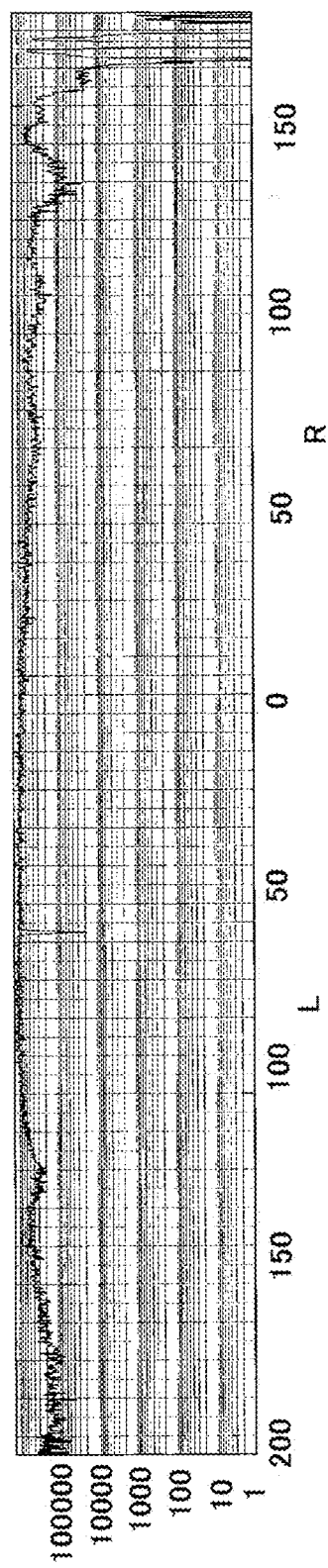

FIG. 23 shows the luminance distribution of the exiting light rays projected from the light guide body 10 when all the LED light sources (2a to 2g) are turned on (the emission pattern shown in FIG. 22) calculated by optical simulation.

The optical simulation of the luminance distribution in FIG. 23 also shows that a substantially uniform luminance distribution is obtained over the entire region of the exiting light rays (La to Lg), and it can be confirmed that a vehicular light having a good appearance at the time of lighting is realized.

Figure 24:
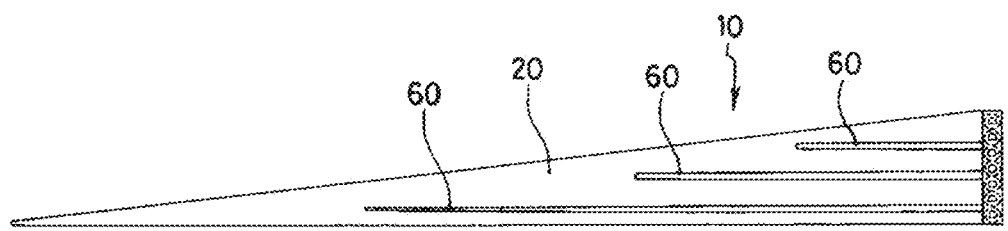
FIG. 24 is a diagram illustrating another light guide body.

As an optical countermeasure for further enlargement of the light guide body 10, as shown in FIG. 24, it is also possible to arrange a plurality of slits 60 having the above-described optical function in the light guide portion 20 in parallel to one another. When they are provided, the light guide loss due to the spread of the guided light rays guided over a long distance within the light guide portion 20 is suppressed and the light utilization efficiency for the exiting light rays is increased. Thus, it is possible to secure a predetermined luminance (brightness) even for enlargement of the light guide body 10.

Figure 25:
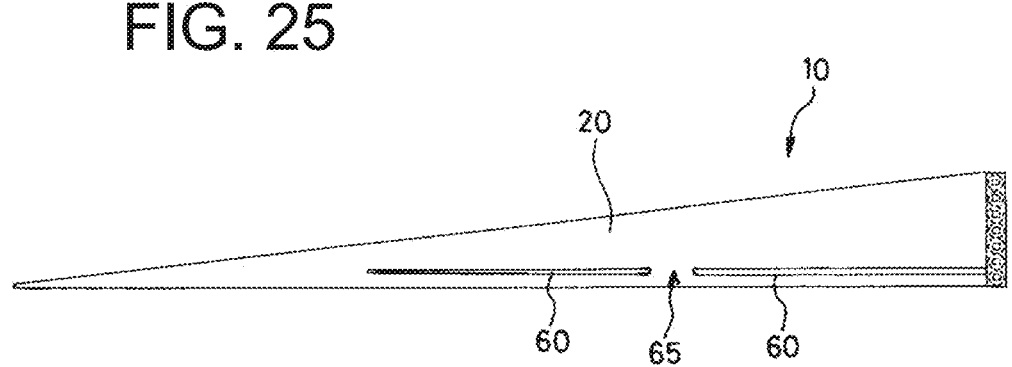
FIG. 25 is a diagram illustrating still another light guide body.

Incidentally, in order to increase the size of the light guide body 10, it may be difficult to provide a long slit 60 with a narrow width corresponding to the increase in the size of the light guide body 10 when molding by injection molding. In this case, as shown in FIG. 25, it is conceivable to divide the slit 60 in the light guide portion 20. At this time, the space 65 between the slits 60 necessary for injection molding hardly adversely affects in terms of optical performance.

Figure 26:
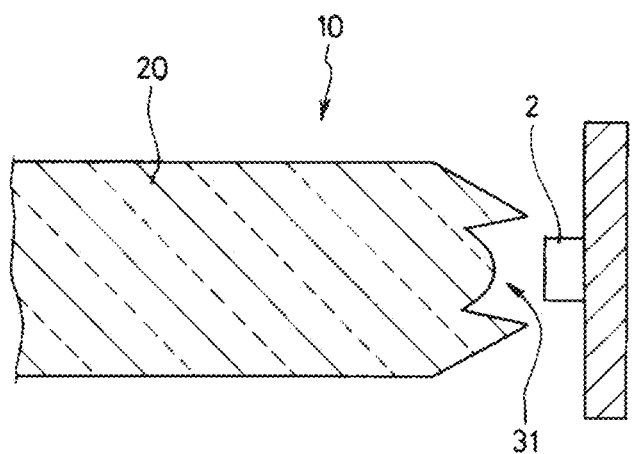
FIG. 26 is a diagram illustrating further another light guide body.

In the light guide optical system 1 described above, the LED light source 2 is disposed below the light guide portion 20 of the light guide body 10, and the light rays emitted upward are internally reflected (totally reflected) to form an optical path toward the plane direction of the light guide 20; however, as shown in FIG. 26, the LED light source 2 may be arranged on the side of the light guide portion 20 of the light guide body 10, and the light emitted from the LED light source 2 may be received by and taken into the light guide portion 20 as substantially parallel light from the light incident reflection surface 31 formed on the end surface of the light guide portion 20 without the light traveling direction being bent by the reflection surface.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular light comprising:
a plurality of LED light sources; and
a light guide body configured to take in and guide light rays from each of the plurality of LED light sources and cause the guided light rays to exit therefrom, wherein the light guide body has:
 a light incident portion configured to receive light rays from each of the plurality of LED light sources so that entered light rays are substantially parallel light rays,
 a light guide portion configured to guide the respective substantially parallel light rays taken from the light incident portion in the same direction,
 a light reflection portion configured to internally reflect the light rays guided by the light guide portion toward a light exit portion having a light exit surface, and
 the light exit portion configured to allow the light rays reflected by the light reflection portion to exit toward the outside,
the light guide portion is provided with at least one slit extending along a light guiding direction of the substantially parallel light rays,
the slit is formed to penetrate the light guide portion in a thickness direction thereof and linearly extend along the light exit surface between a position corresponding to an LED light source located closest to the light exit surface of the light guide portion and a position corresponding to an LED light source adjacent thereto among the plurality of the LED light sources, while the slit is formed within a predetermined length range from the LED light source,
the slit has a tapered width region formed in at least a part of the predetermined length range and gradually narrowing in width, and
the slit has a distal end surface that is a curved convex surface that forms a distal end portion of the tapered width region.

2. The vehicular light according to claim 1, wherein the slit is provided between respective light guide paths through which the substantially parallel light rays are guided adjacent to each other within the light guide portion.

3. The vehicular light according to claim 1, wherein the light guide portion is a flat plate-shaped member with a substantially triangular shape, and portions corresponding to respective sides of the triangular shape serve as the light incident portion, the light reflection portion, and the light exit portion, respectively, and
the light incident portion and the light exit portion are located at positions where a right angle is sandwiched. therebetween, and the light reflection portion is located at a position of an oblique side of the triangle shape.

4. The vehicular light according to claim 1, wherein the slit has side walls at least one of which is subjected to a light diffusion treatment.

5. The vehicular light according to claim 1, wherein the slit has a constant width region formed in another part of the predetermined length range extending from the LED light source and having a constant width.

6. The vehicular light according to claim 2, wherein the light guide portion is a flat plate-shaped member with a substantially triangular shape, and portions corresponding to respective sides of the triangular shape serve as the light incident portion, the light reflection portion, and the light exit portion, respectively, and
the light incident portion and the light exit portion are located at positions where a right angle is sandwiched therebetween, and the light reflection portion is located at a position of an oblique side of the triangle shape.

7. The vehicular light according to claim 2, wherein the slit has side walls at least one of which is subjected to a light diffusion treatment.

8. The vehicular light according to claim 2, wherein the slit has a constant width region formed in another part of the predetermined length range extending from the LED light source and having a constant width.

9. The vehic light according to claim 3, wherein the slit is provided along the light exit portion.

10. The vehicular light according to claim 3, wherein the slit has side walls at least one of which is subjected to a light diffusion treatment.

11. The vehicular light according to claim 3, wherein the slit has a constant width region formed in another part of the predetermined length range extending from the LED light source and having a constant width.

12. The vehicular light according to claim 6, wherein the slit is provided along the light exit portion.

13. The vehicular light according to claim 6, wherein the slit has a constant width region formed in another part of the predetermined length range extending from the LED light source and having a constant width.

14. The vehicular light according to claim 9, wherein the slit has side walls at least one of which is subjected to a light diffusion treatment.

* * * * *